(12) United States Patent
Gobriel et al.

(10) Patent No.: US 10,313,240 B2
(45) Date of Patent: Jun. 4, 2019

(54) TECHNOLOGIES FOR EFFICIENT NETWORK FLOW CLASSIFICATION WITH VECTOR BLOOM FILTERS

(71) Applicant: Intel Corporation, Santa Clara, CA (US)

(72) Inventors: Sameh Gobriel, Dublin, CA (US); Wei Shen, Hillsboro, OR (US); Tsung-Yuan C. Tai, Portland, OR (US); Ren Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 15/632,592

(22) Filed: Jun. 26, 2017

(65) Prior Publication Data

US 2018/0375773 A1    Dec. 27, 2018

(51) Int. Cl.
*H04L 12/927* (2013.01)
*H04L 12/743* (2013.01)
*H04L 12/741* (2013.01)
*H04L 29/12* (2006.01)
*H04L 12/755* (2013.01)

(52) U.S. Cl.
CPC ........ *H04L 45/7457* (2013.01); *H04L 45/745* (2013.01); *H04L 61/2046* (2013.01); *H04L 45/021* (2013.01); *H04L 45/7453* (2013.01)

(58) Field of Classification Search
CPC .............. H04L 45/7457; H04L 45/745; H04L 61/2046; H04L 45/021; H04L 45/7453; H04L 45/00; H04L 45/306; H04L 45/38; H04L 45/48; H04L 45/34; H04L 69/22; H04L 47/2441; H04L 43/026; H04L 45/74
See application file for complete search history.

(56) References Cited

U.S. PATENT DOCUMENTS

| 8,559,434 B2 * | 10/2013 | Esteve Rothenberg ..................... H04L 45/00 370/392 |
| 8,630,294 B1 * | 1/2014 | Keen .................... H04L 45/7453 370/252 |
| 8,824,474 B2 * | 9/2014 | Esteve Rothenberg ..................... H04L 45/00 370/392 |
| 2008/0232275 A1 * | 9/2008 | Eswaran ............. H04L 12/4625 370/256 |
| 2012/0300781 A1 * | 11/2012 | Sarela ..................... H04L 45/10 370/392 |

(Continued)

*Primary Examiner* — Wutchung Chu
(74) *Attorney, Agent, or Firm* — Barnes & Thornburg LLP

(57) ABSTRACT

Technologies for efficient network flow classification include a computing device that receives a network packet that includes a header. The computing device generates a vector Bloom filter (VBF) key as a function of the header and searches multiple VBFs for a VBF that matches the VBF key. Each VBF is associated with a flow sub-table that includes one or more flow rules. Each flow sub-table is associated with a mask length. If a matching VBF is found, the computing device searches the corresponding flow sub-table for a flow rule that matches a masked header of the network packet. If no matching VBF is found or if no matching flow rule is found, the computing device searches all of the flow sub-tables for a flow rule that matches the header. The computing device applies a flow action of a matching flow rule. Other embodiments are described and claimed.

22 Claims, 5 Drawing Sheets

(56) References Cited

U.S. PATENT DOCUMENTS

| | | | |
|---|---|---|---|
| 2013/0246651 A1* | 9/2013 | Keen | H04L 45/7453 709/238 |
| 2014/0157405 A1* | 6/2014 | Joll | H04L 63/1425 726/22 |
| 2015/0215236 A1* | 7/2015 | Joshi | G06F 16/2255 707/754 |
| 2015/0244842 A1* | 8/2015 | Laufer | H04L 69/22 370/392 |
| 2016/0182373 A1* | 6/2016 | Wang | H04L 45/7453 370/392 |
| 2016/0294625 A1* | 10/2016 | Mahkonen | H04L 43/08 |
| 2016/0315914 A1* | 10/2016 | Lee | H04L 63/0414 |
| 2017/0005952 A1* | 1/2017 | Lee | H04L 49/901 |
| 2018/0097728 A1* | 4/2018 | Bodi Reddy | H04L 45/745 |

\* cited by examiner

TECHNOLOGIES FOR EFFICIENT NETWORK FLOW CLASSIFICATION WITH VECTOR BLOOM FILTERS

BACKGROUND

Flow classification is a common stage of many network functions in which a flow identifier (e.g., one or more packet header fields) is used to index a flow table to select an action to be performed on the flow. Traditional high-performance network routers typically use a ternary content-addressable memory (TCAM) to implement flow classification. TCAMs typically provide good performance compared to traditional RAM (e.g., DRAM or SRAM) at the expense of power efficiency and/or size.

Increasingly, network functions traditionally performed by dedicated hardware devices are being performed using general-purpose computers, such as server computers that include one or more Intel® Xeon® processors. For example, network functions such as routing, packet filtering, caching, and other network functions may be executed by a virtualization platform, which may include any combination of network function virtualization (NFV), software-defined networking (SDN), and/or software-defined infrastructure (SDI).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
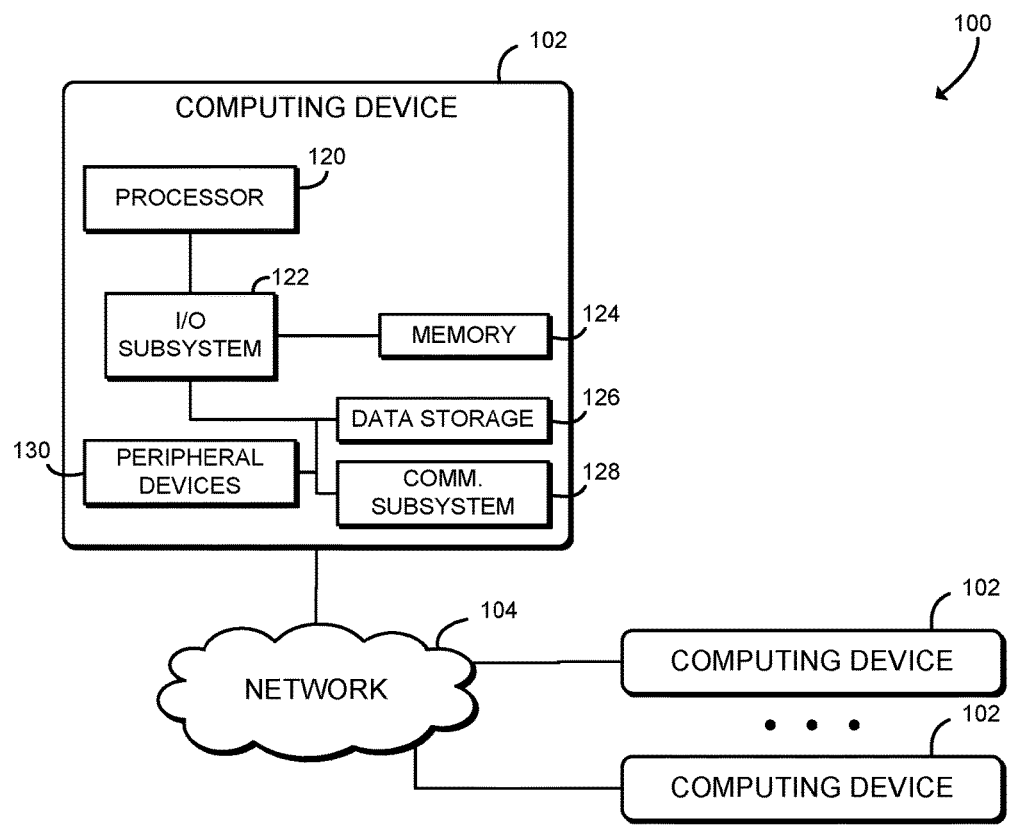
FIG. 1 is a simplified block diagram of at least one embodiment of a system for efficient network flow classification with vector Bloom filters.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for efficient network flow classification includes multiple computing devices 102 in communication over a network 104. Each computing device 102 may receive a network packet, classify the network packet to identify an applicable flow rule, and apply the flow rule. To classify the network packet, the computing device 102 matches a header of the packet against multiple vector Bloom filters (without masking the header) to identify a flow sub-table that is likely with very high probability to include a flow rule that matches the packet. If the header does not match any rule in the target flow sub-table, the computing device 102 searches the flow sub-tables sequentially one by one for a rule that matches the masked header (i.e., matches with wildcards) and, if a match is found, inserts the header into the associated vector Bloom filter. By searching the vector Bloom filters using the unmasked header, the computing device 102 may avoid performing multiple memory accesses and mask operations for many network packets. In use, avoiding those memory accesses and/or mask operations may improve performance over searching the flow tables for matching rules and/or searching traditional Bloom filters using the masked header. By improving classification performance, the computing device 102 may also perform packet classification with improved power efficiency and/or reduced cost as compared to typical computing devices or as compared to dedicated network devices that include TCAMs.

Each computing device 102 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively include a processor 120, an input/output subsystem 122, a memory 124, a data storage device 126, and a communication subsystem 128, and/or other components and devices commonly found in a notebook computer or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102, such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 102 may be embodied as any communication circuit, device, or collection thereof, capable of enabling communications between the computing device 102 and other remote devices over a network. The communication subsystem 128 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 102 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

As discussed in more detail below, the computing devices 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), and/or a wired or wireless wide area network (WAN). As such, the network 104 may include any number of additional devices, such as additional computers, routers, and switches, to facilitate communications among the devices of the system 100. In the illustrative embodiment, the network 104 is embodied as a local Ethernet network.

Figure 2:
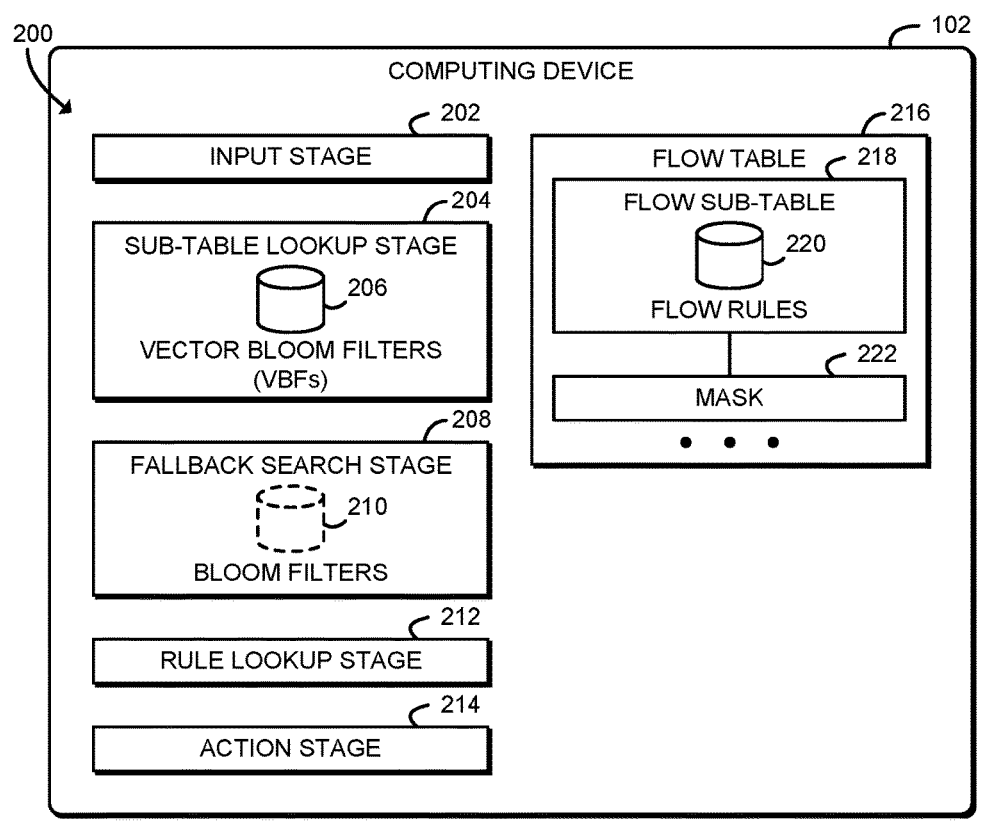
FIG. 2 is a simplified block diagram of at least one embodiment of an environment that may be established by a computing device of FIG. 1.

Referring now to FIG. 2, in an illustrative embodiment, the computing device 102 establishes an environment 200 during operation. The illustrative environment 200 includes an input stage 202, a sub-table lookup stage 204, a fallback search stage 208, a rule lookup stage 212, and an action stage 214. The various components of the environment 200 may be embodied as hardware, firmware, software, or a combination thereof. As such, in some embodiments, one or more of the components of the environment 200 may be embodied as circuitry or collection of electrical devices (e.g., input circuitry 202, sub-table lookup circuitry 204, fallback search circuitry 208, rule lookup circuitry 212, and/or action circuitry 214). It should be appreciated that, in such embodiments, one or more of the input circuitry 202, the sub-table lookup circuitry 204, the fallback search circuitry 208, the rule lookup circuitry 212, and/or the action circuitry 214 may form a portion of one or more of the processor 120, the I/O subsystem 122, and/or other components of the computing device 102. Additionally, in some embodiments, one or more of the illustrative components may form a portion of another component and/or one or more of the illustrative components may be independent of one another.

The input stage 202 is configured to receive a network packet. The network packet may be embodied as a data link layer packet, an Ethernet frame, or other network packet. The network packet includes a header. As described further below, the network packet is classified into a flow based on the header, and then an appropriate flow action is applied to the network packet. The flow classification and actions are configured using a flow table 216, as described further below.

The sub-table lookup stage 204 is configured to generate a vector Bloom filter (VBF) key as a function of the header of the network packet and to search multiple vector Bloom filters (VBFs) 206 for VBFs 206 that match the VBF key. Each VBF 206 is associated with a flow sub-table 218 of the flow table 216. Each flow sub-table 218 includes one or more flow rules 220, and each flow sub-table 218 is associated with a mask 222 that has a particular mask length and particular wild card bits. The sub-table lookup stage 204 is further configured to insert the VBF key into a VBF 206 that is associated with a matching flow sub-table 218 in response to the fallback search stage 208 finding a matching flow rule 220, as described below.

The rule lookup stage 212 is configured to search the flow sub-table 218 that is associated with a matching VBF 206 for a flow rule 220 that matches the header of the network packet. The rule lookup stage 212 is configured to search the flow sub-table 218 in response to determining that the VBF 206 associated with the flow sub-table 218 matches the VBF key.

The fallback search stage 208 is configured to search the flow sub-tables 218 for a flow rule 220 that matches the header of the network packet if the VBF key does not match any VBF 206. The fallback search stage 208 is also configured to search the flow sub-tables 218 for a flow rule 220 that matches the header of the network packet if the header of the network packet does not match any flow rule 220 of the flow sub-table 218 that is associated with the matching vector Bloom filter 206. In some embodiments, the fallback search stage 208 may be configured to search the sub-tables 218 by masking the header of the network packet with the mask 222 associated with a flow sub-table 218 to generate a masked header, generating a Bloom filter key as a function of the masked header, and determining whether the Bloom filter key matches a Bloom filter 210 associated with the flow sub-table 218. In some embodiments, the fallback search stage 208 may be configured to search the flow sub-tables 218 sequentially for flow rules 220 that match the header of the network packet.

The routing stage 214 is configured to apply a flow action of the matching flow rule 220 in response to searching the flow sub-table 218. Applying the flow action may include forwarding the network packet, dropping the network packet, encapsulating a new packet header, or performing other network functions. The action stage 214 may be further configured to apply a default flow action if the header of the network packet does not match any flow rule 220 included in any of the flow sub-tables 218.

Figure 3:
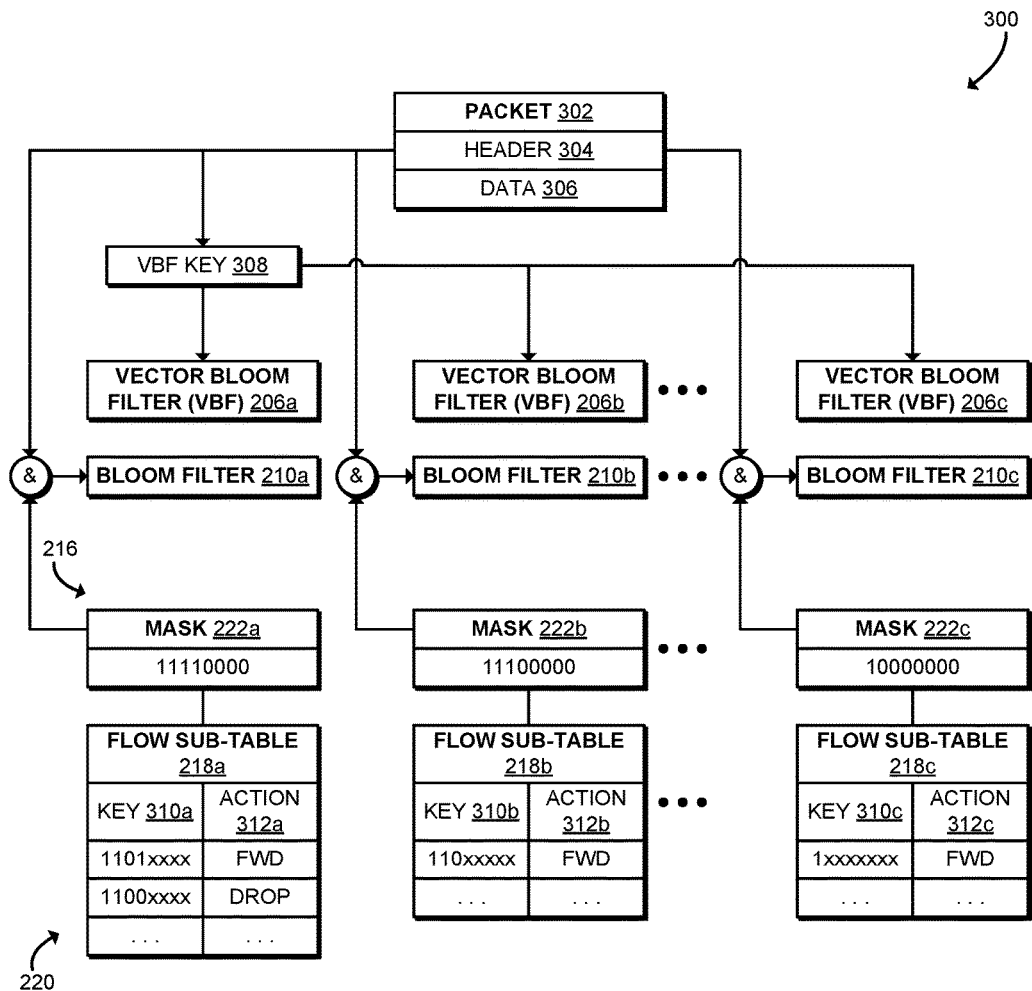
FIG. 3 is a schematic diagram of at least one embodiment of data structures that may be established by the computing device of FIGS. 1-2.

Referring now to FIG. 3, diagram 300 illustrates one potential embodiment of various data structures that may be established by the computing device 102. As shown, the computing device 102 establishes a flow table 216 that includes multiple flow sub-tables 218. Each flow sub-table 218 is associated with a mask 222 of different length (i.e., including a different number of most-significant bits that are set) and includes multiple flow rules 220. The illustrative flow table 216 includes three flow sub-tables 218*a*, 218*b*, 218*c* and three masks 222*a*, 222*b*, 222*c*. Of course, in other embodiments the computing device 102 may establish a different number of flow sub-tables 218 and corresponding masks 222. As shown in FIG. 3, the computing device 102 establishes multiple VBFs 206, and each VBF 206 is associated with a flow sub-table 218 and a corresponding mask 222. In the illustrative embodiment, each flow sub-table 218 is also associated with an ordinary, non-vector Bloom filter 210, although in some embodiments the computing device 102 may not establish or otherwise use the Bloom filters 210.

As shown, each of the masks 222 may be embodied as a binary value with a certain number (i.e., the mask length) of most-significant bits set. The diagram 300 illustratively shows the mask 222*a* equal to 0xF0 (i.e., four leading bits set), the mask 222*b* equal to 0xE0 (i.e., three leading bits set), and the mask 222*c* equal to 0x80 (i.e., one leading bit set). Although illustrated as including up to eight bits, it should be understood that in other embodiments the masks 222 may include a different number of bits. As shown, each flow sub-table 218 may include multiple flow rules 220, and each flow rule 220 includes a key 310 and an action 312. Each key 310 includes a pattern of bits. The bits of the key 310 that are in positions that are set in the corresponding mask 222 define a pattern to match against the packet header 304, and the bits of the key 310 that are in positions that are not set in the corresponding mask 222 are wildcards and may match any value in a packet header 304. For example, the illustrative flow sub-table 218*a* corresponds to the mask 222*a* and thus the keys 310*a* of the flow sub-table 218*a* include four most-significant matching bits followed by wildcard bits (e.g., the illustrative values 1101xxxx and 1100xxxx). As another example, the illustrative flow sub-table 218*b* corresponds to the mask 222*b* and thus the keys 310*b* of the flow sub-table 218*b* include three most-significant matching bits followed by wildcard bits (e.g., the illustrative value 110xxxxx). The action 312 of each rule may be embodied as any packet routing action, such as forward or drop.

In use, as described further below, the computing device 102 may receive a network packet 302. As shown, the network packet 302 includes a header 304 and data 306. As a first level of indirection, the computing device 102 uses the header 304 to generate a VBF key 308 using, for example, a hashing function or any other mechanism to hash the packet fields into a VBF key. The same VBF key 308 is tested against each of the VBFs 206*a*, 206*b*, 206*c* to identify the corresponding flow sub-table 218 that is likely to include a flow rule 220 that matches the network packet 302.

If the network packet 302 does not match any VBF 206, as a second level of indirection the computing device 102 may mask the header 304 with the mask 222*a* to generate a masked header. The resulting masked header may be tested against the Bloom filter 210*a* corresponding with the flow sub-table 218*a*. If the masked header does not match the Bloom filter 210*a*, the header 304 may be masked with the mask 222*b*, and the resulting masked header may be tested against the Bloom filter 210*b*, and so on, until a match is found or until the header 304 is masked with the mask 222*c* and tested against the Bloom filter 210*c*.

Additionally or alternatively, the computing device 102 may sequentially search the flow sub-tables 218 using the header 304. For example, the computing device 102 may sequentially search the flow sub-tables 218 if the masked header is not found in any Bloom filter 210, or if the Bloom filters 210 are not used the computing device 102 may sequentially search the sub-tables 218 after determining that the VBF key 308 does not match any VBF 206. To sequentially search the flow sub-tables 218, the header 304 may be masked with the mask 222*a*, and the resulting masked header may be used to index the flow sub-table 218*a*. If the masked header is not found in the flow sub-table 218*a*, the header 304 may be masked with the mask 222*b*, and the resulting masked header may be used to index the flow sub-table 218*b*, and so on, until the header 304 may be masked with the mask 222*c*, and the resulting masked header may be used to index the flow sub-table 218*c*.

Figure 4A:
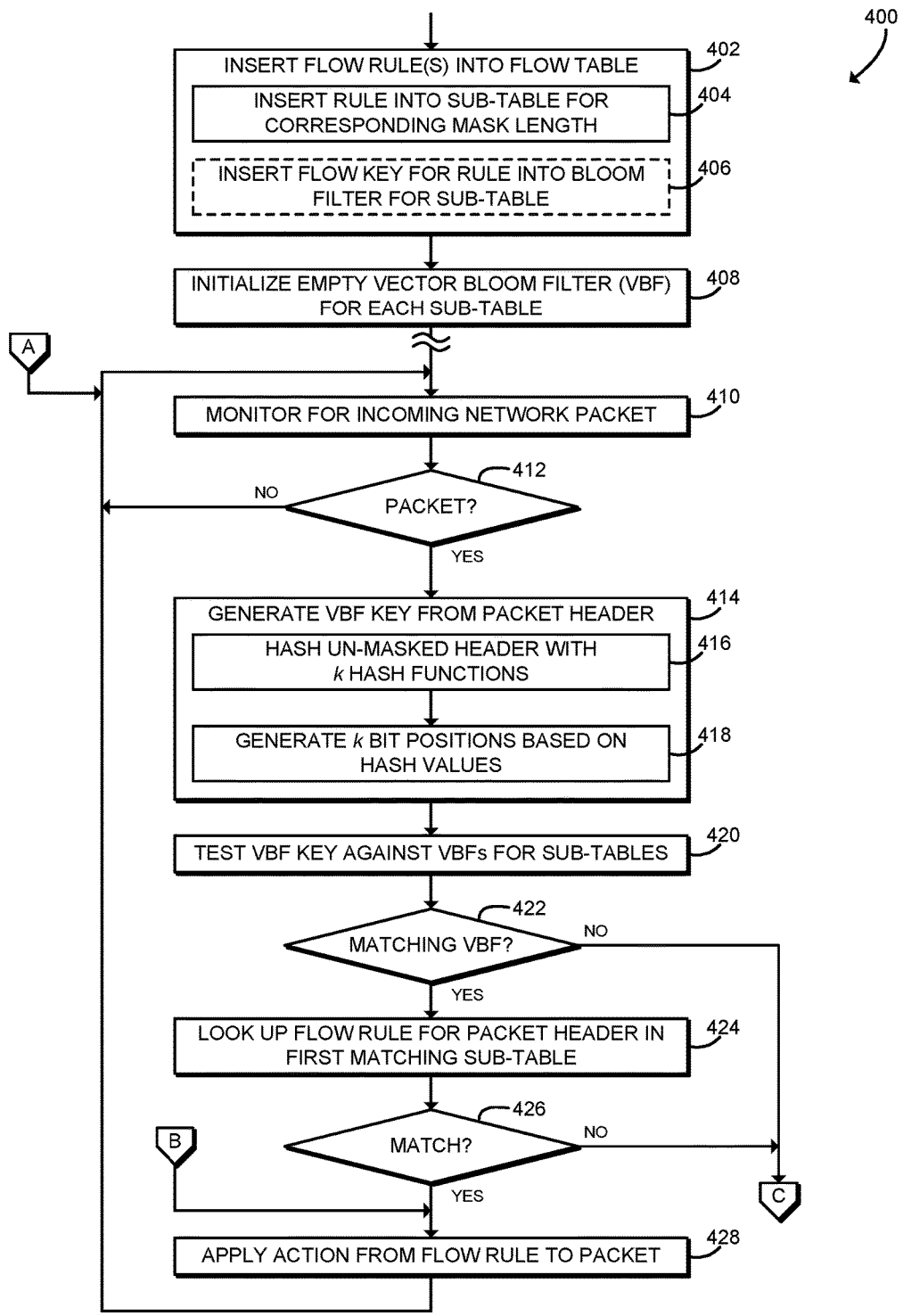
FIGS. 4A and 4B are a simplified flow diagram of at least one embodiment of a method for network flow classification that may be executed by the computing device of FIGS. 1-2.
Figure 4B:
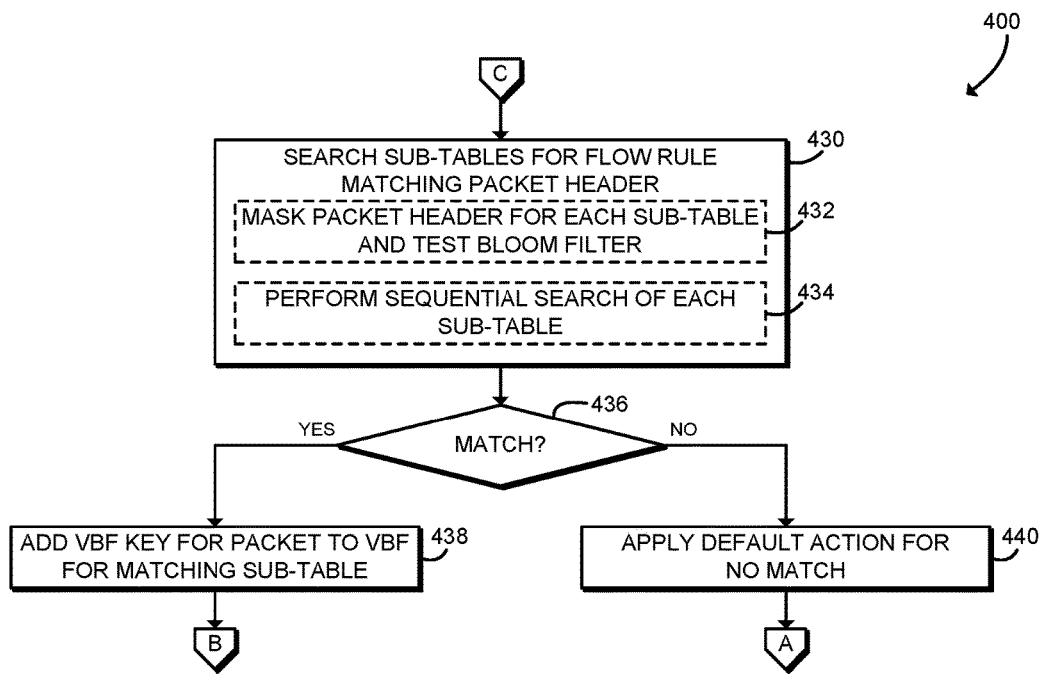

Referring now to FIGS. 4A and 4B, in use, a computing device 102 may execute a method 400 for network flow classification. It should be appreciated that, in some embodiments, the operations of the method 400 may be performed by one or more components of the environment 200 of the computing device 102 as shown in FIG. 2. The method 400 begins in block 402, in which the computing device 102 inserts one or more flow rules 220 into the flow table 216. As described further below, the flow rules 220 may be used to classify network packets 302 and then perform routing operations on the packets 302. Each flow rule 220 may include a key and an associated action. The key may be generated or otherwise determined by masking a pattern with an associated mask 222. The key matches a network packet 302 when the key matches a header 304 of the network packet 302 after the header 304 has also been masked with the mask 222. In other words, the key defines a prefix pattern and subsequent wildcards that are matched against the packet header 304. As described further below, when multiple flow rules 220 match a network packet 302, the computing device 102 identifies the flow rule 220 with the longest matching prefix.

In block 404, each flow rule 220 is inserted into a flow sub-table 218 associated with the corresponding mask 222 length. The mask length is the number of most-significant bits of the mask 222 that are set, and determines the number of most-significant bits of the packet header 304 that are matched against the key of the flow rule 220. Thus, each flow rule 220 associated a particular mask length is inserted in the same flow sub-table 218. Each flow sub-table 218 may be embodied as a hash table, and may be indexed by flow key (e.g., the masked header of a network packet 302). In some embodiments, in block 406 the flow key for each flow rule 220 may be inserted into a Bloom filter 210 associated with the corresponding flow sub-table 218. In other words, the pattern for each flow rule 220, after applying the mask 222, is inserted into a Bloom filter 210 for the corresponding flow sub-table 218.

Each Bloom filter 210 is a probabilistic data structure that may be used to determine whether the corresponding flow sub-table 218 is likely to include a flow rule 220 that matches a particular flow key. For example, one or more hash functions may be applied to the flow key to generate corresponding hash values, and those hash values may be converted to bit positions. Each Bloom filter 210 may be embodied as an array of bits. The flow key may be inserted into a Bloom filter 210 by setting the bits at each bit position. The Bloom filter 210 may be queried for the presence of the flow key by determining whether the bits at each bit position are set. A Bloom filter 210 does not produce false negatives; that is, if any bit position is not set, then the flow key has not been inserted in the filter. However, due to hash collisions, the Bloom filter 210 may generate false positives. Typically, Bloom filters 210 do not support removing elements. Thus, to support deletion of flow rules 220, in some embodiments the Bloom filters 210 may be embodied as counting Bloom filters and/or the computing device 102 may establish offline counting Bloom filters.

In block 408, the computing device 102 initializes an empty vector Bloom filter (VBF) 206 for each flow sub-table 218. Similar to an ordinary Bloom filter 210, each VBF 206 may be embodied as a bit array. However, as described further below, each VBF 206 may track unmasked packet header 304 values rather than masked flow keys. Additionally, each VBF 206 is initially empty, and flow keys for the flow rules 220 are not inserted into the VBFs 206. To support deletion, in some embodiments the VBFs 206 may be embodied as counting Bloom filters and/or the computing device 102 may establish offline counting Bloom filters.

After initializing the flow table 216 and the VBFs 206, the method 400 advances to block 410, in which the computing device 102 monitors for an incoming network packet 302. The network packet 302 may be embodied as any layer 2 packet, Ethernet frame, or other network packet received from a remote device (e.g., another computing device 102) using the communication subsystem 128. Additionally or alternatively, in some embodiments, the network packet 302 may be generated by the computing device 102 itself, for example by one or more virtualized network functions executed by the computing device 102. In block 412, the computing device 102 determines whether a network packet 302 has been received. If not, the method 400 loops back to block 410 to continue monitoring for incoming network packets 302. If a network packet 302 is received, the method 400 advances to block 414.

In block 414, the computing device 102 generates a VBF key 308 based on the header 304 of the received network packet 302. The computing device 102 generates the VBF key 308 based on the entire, un-masked packet header 304 without masking off any part of the header 304 (e.g., without applying a mask 222 associated with any flow sub-table 218 or flow rule 220). To generate the VBF key 308, in block 416 the computing device 102 may hash the un-masked packet header 304 with a number k of hash functions to generate a corresponding number k of hash values. The number k of hash functions may be selected to achieve a certain probability of false positives. Typically, for a given VBF filter size, the false positive probability may be made small (on the order of 2-3%) by using several hash functions (e.g., for a given VBF filter size, the number of minimum hash functions can be calculated to guarantee a maximum false positive rate). In block 418, the computing device 102 generates k bit positions based on the k hash values. For example, the computing device 102 may determine each bit position as the corresponding hash value modulo the VBF filter size.

In block 420, the computing device 102 tests the VBF key 308 against the VBFs 206 associated with the flow sub-tables 218. To test the VBF key 308 against a VBF 206, the computing device 102 determines whether each bit position indicated by the VBF key 308 is set within the VBF 206. If each bit position is set, then the header 304 of the network packet 302 has likely already been inserted into the VBF 206. The computing device 102 may test each VBF 206 sequentially, in parallel, or in any other order. Additionally, the same VBF key 308 is tested against each VBF 206.

After testing the VBF key 308, in block 422 the computing device 102 determines whether a matching VBF 206 was found. Note that multiple matching VBFs 206 may be possible If no matching VBF 206 was found, the method 400 branches to block 430, shown in FIG. 4B and described below. If a matching VBF 206 was found, the method 400 advances to block 424.

In block 424, the computing device 102 looks up a flow rule 220 that matches the packet header 304 in the flow sub-table 218 associated with the matching VBF 206. The computing device 102 may generate a flow key by applying the mask 222 to the packet header 304 and then index the flow sub-table 218 with the flow key to look up the corresponding flow rule 220. Of course, because the VBF 206 is a probabilistic data structure, in the event of a false positive, there may be no matching flow rule 220 included in the flow sub-table 218. Note that in the event of multiple matching VBFs 206, at most one flow sub-table 218 associated with a matching VBF 206 may include a matching flow rule 220 (due to potential false positives). In block 426, the computing device 102 determines whether a matching flow rule 220 was found. If not, the method 400 branches to block 430, shown in FIG. 4B and described below. If a matching flow rule 220 was found, the method 400 advances to block 428.

In block 428, the computing device 102 applies the action 312 from the flow rule 220 to the network packet 302. For example, the computing device 102 may forward the packet 302 to a next hop destination, drop the packet 302, or perform another packet routing task or network function. After applying the action 312, the method 400 loops back to block 410 to continue monitoring for incoming network packets 302.

Referring now to FIG. 4B, after determining that the VBF key 308 is not found in any VBF 206 as described above in connection with block 422 or after determining that a flow rule 220 matching the packet header 304 is not found in the flow sub-table 218 as described above in connection with block 426, the method 400 branches to block 430. In block 430, the computing device 102 searches all of the flow sub-tables 218 for a flow rule 220 that matches the packet header 304. The computing device 102 may use any appropriate technique to search the flow sub-tables 218. In some embodiments, in block 432 the computing device 102 may apply a mask 222 corresponding to each sub-table 218 to the packet header 304 and then test the masked header against a conventional Bloom filter 210 associated with the flow sub-table 218. If the masked header matches a Bloom filter 210, the computing device 102 may look up a flow rule 220 in the flow sub-table 218 with the flow key as described above in connection with block 424.

In some embodiments, in block 434, the computing device 102 may perform a sequential search of each flow sub-table 218. The computing device 102 may search the flow sub-tables 218 for a flow rule 220 that matches the masked header of the packet 302, and if multiple matching flow rules 220 are found, the computing device 102 may select the flow rule 220 with the longest matching prefix. For example, the computing device 102 may start by searching the flow sub-table 218 corresponding with the longest mask 222 and return the first matching flow rule 220. If no matching flow rule 220 is found, the computing device 102 may proceed to search the flow sub-table 218 with the next-longest mask 222, and so on. The computing device 102 may perform the sequential search if the masked header is not found in any Bloom filter 210 or if the Bloom filter 210 is not used.

After searching for a matching flow rule 220 in the flow sub-tables 218, in block 436, the computing device 102 determines whether a matching flow rule 220 was found in any flow sub-table 218. If not, the method 400 branches to block 440, described below. If a matching flow rule 220 was found, the method branches to block 438. In block 438, the computing device 102 inserts the VBF key 308 into the VBF 206 associated with the flow sub-table 218 that includes the matching flow rule 220. Thus, subsequent network packets 302 that include the same header 304 (e.g., network packets 302 included in the same flow) may be matched against that VBF 206, which may improve classification performance Because subsequent packets 302 may be matched efficiently without performing multiple memory operations and/or mask operations, overall packet classification throughput may be improved, even if the first packet 302 of a flow does not match a VBF 206. After inserting the VBF key 308 into the VBF 206, the method 400 loops back to block 428, shown in FIG. 4A, to apply the action 312 from the matching flow rule 220.

Referring back to block 436, if a matching flow rule 220 is not found in a flow sub-table 218, the method 400 branches to block 440. In block 440, the computing device 102 may apply a default action for flows that do not match any rule in the flow table 216. For example, the computing device 102 may drop the network packet 302. After applying the default rule, the method 400 loops back to block 410, shown in FIG. 4A, to continue monitoring for incoming network packets 302.

It should be appreciated that, in some embodiments, the method 400 may be embodied as various instructions stored on a computer-readable media, which may be executed by the processor 120, the I/O subsystem 122, and/or other components of a computing device 102 to cause the computing device 102 to perform the method 400. The computer-readable media may be embodied as any type of media capable of being read by the computing device 102 including, but not limited to, the memory 124, the data storage device 126, firmware devices, and/or other media.

EXAMPLES

Illustrative examples of the technologies disclosed herein are provided below. An embodiment of the technologies may include any one or more, and any combination of, the examples described below.

Example 1 includes a computing device for network packet routing, the computing device comprising: an input stage to receive a network packet that includes a header; a sub-table lookup stage to (i) generate a vector Bloom filter key as a function of the header of the network packet, and (ii) search a plurality of vector Bloom filters for a first vector Bloom filter that matches the vector Bloom filter key, wherein each vector Bloom filter is associated with a flow sub-table, wherein each flow sub-table comprises one or more flow rules, and wherein each flow sub-table is associated with a mask; a rule lookup stage to search a flow sub-table that is associated with the first vector Bloom filter for a first flow rule that matches the header of the network packet in response to a search of the plurality of vector Bloom filters for the first vector Bloom filter; and an action stage to apply a flow action of the first flow rule in response to a search of the flow sub-table.

Example 2 includes the subject matter of Example 1, and wherein: to search the plurality of vector Bloom filters comprises to determine whether the vector Bloom filter key matches any vector Bloom filter of the plurality of vector Bloom filters; and to search the flow sub-table comprises to determine whether the header of the network packet matches any flow rule of the flow sub-table that is associated with the vector Bloom filter.

Example 3 includes the subject matter of any of Examples 1 and 2, and further comprising a fallback search stage to: search the plurality of flow sub-tables for the first flow rule that matches the header of the network packet in response to a determination that the vector Bloom filter key does not match any vector Bloom filter or in response to a determination that the header of the network packet does not match any flow rule of the flow sub-table that is associated with the vector Bloom filter, wherein the first flow rule is included in a first flow sub-table; wherein the sub-table lookup stage is further to insert the vector Bloom filter key into a vector Bloom filter that is associated with the first flow sub-table in response to a search of the plurality of flow sub-tables for the first flow rule.

Example 4 includes the subject matter of any of Examples 1-3, and wherein to apply the flow action of the first flow rule further comprises to apply the flow action of the first flow rule in response to the search of the plurality of flow sub-tables for the first flow rule.

Example 5 includes the subject matter of any of Examples 1-4, and wherein to search the plurality of flow sub-tables comprises to: mask the header of the network packet with the mask associated with a flow sub-table to generate a masked header; generate a Bloom filter key as a function of the masked header; and determine whether the Bloom filter key matches a Bloom filter associated with the flow sub-table.

Example 6 includes the subject matter of any of Examples 1-5, and wherein to search the plurality of flow sub-tables comprises to sequentially search each flow sub-table of the plurality of flow sub-tables in an order that is determined based on a length of the mask associated with each flow sub-table.

Example 7 includes the subject matter of any of Examples 1-6, and wherein to search the plurality of flow sub-tables for the first flow rule that matches the header of the network packet comprises to determine whether the header of the network packet matches any flow rule of the plurality of flow sub-tables.

Example 8 includes the subject matter of any of Examples 1-7, and wherein the action stage is further to apply a default flow action in response to a determination that the header of the network packet does not match any flow rule of the plurality of flow sub-tables.

Example 9 includes the subject matter of any of Examples 1-8, and wherein to generate the vector Bloom filter key comprises to: hash the header of the network packet with a plurality of hash functions to generate a plurality of hash values; and generate a plurality of bit positions as a function of the plurality of hash values, wherein each bit position corresponds to a hash value.

Example 10 includes the subject matter of any of Examples 1-9, and wherein to search the flow sub-table that is associated with the first vector Bloom filter for the first flow rule comprises to: mask the header of the network packet with the mask associated with the flow sub-table to generate a masked header; and search the flow sub-table for a flow rule that matches the masked header.

Example 11 includes the subject matter of any of Examples 1-10, and wherein to search the flow sub-table for the flow rule that matches the masked header comprises to index the flow sub-table with the masked header.

Example 12 includes the subject matter of any of Examples 1-11, and wherein to apply the flow action comprises to forward the network packet or to drop the network packet.

Example 13 includes the subject matter of any of Examples 1-12, and wherein each flow rule comprises a match pattern and a flow action.

Example 14 includes the subject matter of any of Examples 1-13, and wherein the network packet comprises a data link layer packet.

Example 15 includes the subject matter of any of Examples 1-14, and wherein the network packet comprises an Ethernet frame.

Example 16 includes the subject matter of any of Examples 1-15, and further comprising: one or more processors; and one or more memory devices having stored thereon a plurality of instructions that, when executed by the one or more processors, cause the computing device to: receive the network packet, generate the vector Bloom filter key, search the plurality of vector Bloom filters, search the flow sub-table, and apply the flow action.

Example 17 includes a method for network packet routing, the method comprising: receiving, by a computing device, a network packet that includes a header; generating, by the computing device, a vector Bloom filter key as a function of the header of the network packet; searching, by the computing device, a plurality of vector Bloom filters for a first vector Bloom filter that matches the vector Bloom filter key, wherein each vector Bloom filter is associated with a flow sub-table, wherein each flow sub-table comprises one or more flow rules, and wherein each flow sub-table is associated with a mask; searching, by the computing device, a flow sub-table that is associated with the first vector Bloom filter for a first flow rule that matches the header of the network packet in response to searching the plurality of vector Bloom filters for the first vector Bloom filter; and applying, by the computing device, a flow action of the first flow rule in response to searching the flow sub-table.

Example 18 includes the subject matter of Example 17, and wherein: searching the plurality of vector Bloom filters comprises determining whether the vector Bloom filter key matches any vector Bloom filter of the plurality of vector Bloom filters; and searching the flow sub-table comprises determining whether the header of the network packet matches any flow rule of the flow sub-table that is associated with the vector Bloom filter.

Example 19 includes the subject matter of any of Examples 17 and 18, and further comprising: searching, by the computing device, the plurality of flow sub-tables for the first flow rule that matches the header of the network packet in response to determining that the vector Bloom filter key does not match any vector Bloom filter or in response to determining that the header of the network packet does not match any flow rule of the flow sub-table that is associated with the vector Bloom filter, wherein the first flow rule is included in a first flow sub-table; and inserting, by the computing device, the vector Bloom filter key into a vector Bloom filter that is associated with the first flow sub-table in response to searching the plurality of flow sub-tables for the first flow rule.

Example 20 includes the subject matter of any of Examples 17-19, and wherein applying the flow action of the first flow rule further comprises applying the flow action of the first flow rule in response to searching the plurality of flow sub-tables for the first flow rule.

Example 21 includes the subject matter of any of Examples 17-20, and wherein searching the plurality of flow sub-tables comprises: masking the header of the network packet with the mask associated with a flow sub-table to generate a masked header; generating a Bloom filter key as a function of the masked header; and determining whether the Bloom filter key matches a Bloom filter associated with the flow sub-table.

Example 22 includes the subject matter of any of Examples 17-21, and wherein searching the plurality of flow sub-tables comprises sequentially searching each flow sub-table of the plurality of flow sub-tables in an order that is determined based on length of the mask associated with each flow sub-table.

Example 23 includes the subject matter of any of Examples 17-22, and wherein searching the plurality of flow sub-tables for the first flow rule that matches the header of the network packet comprises determining whether the header of the network packet matches any flow rule of the plurality of flow sub-tables.

Example 24 includes the subject matter of any of Examples 17-23, and further comprising applying, by the computing device, a default flow action in response to determining that the header of the network packet does not match any flow rule of the plurality of flow sub-tables.

Example 25 includes the subject matter of any of Examples 17-24, and wherein generating the vector Bloom filter key comprises: hashing the header of the network packet with a plurality of hash functions to generate a plurality of hash values; and generating a plurality of bit positions as a function of the plurality of hash values, wherein each bit position corresponds to a hash value.

Example 26 includes the subject matter of any of Examples 17-25, and wherein searching the flow sub-table that is associated with the first vector Bloom filter for the first flow rule comprises: masking the header of the network packet with the mask associated with the flow sub-table to generate a masked header; and searching the flow sub-table for a flow rule that matches the masked header.

Example 27 includes the subject matter of any of Examples 17-26, and wherein searching the flow sub-table for the flow rule that matches the masked header comprises indexing the flow sub-table with the masked header.

Example 28 includes the subject matter of any of Examples 17-27, and wherein applying the flow action comprises forwarding the network packet or dropping the network packet.

Example 29 includes the subject matter of any of Examples 17-28, and wherein each flow rule comprises a match pattern and a flow action.

Example 30 includes the subject matter of any of Examples 17-29, and wherein the network packet comprises a data link layer packet.

Example 31 includes the subject matter of any of Examples 17-30, and wherein the network packet comprises an Ethernet frame.

Example 32 includes a computing device comprising: a processor; and a memory having stored therein a plurality of instructions that when executed by the processor cause the computing device to perform the method of any of Examples 17-31.

Example 33 includes one or more machine readable storage media comprising a plurality of instructions stored thereon that in response to being executed result in a computing device performing the method of any of Examples 17-31.

Example 34 includes a computing device comprising means for performing the method of any of Examples 17-31.

Example 35 includes a computing device for network packet routing, the computing device comprising: means for receiving a network packet that includes a header; means for generating a vector Bloom filter key as a function of the header of the network packet; means for searching a plurality of vector Bloom filters for a first vector Bloom filter that matches the vector Bloom filter key, wherein each vector Bloom filter is associated with a flow sub-table, wherein each flow sub-table comprises one or more flow rules, and wherein each flow sub-table is associated with a mask; means for searching a flow sub-table that is associated with the first vector Bloom filter for a first flow rule that matches the header of the network packet in response to searching the plurality of vector Bloom filters for the first vector Bloom filter; and means for applying a flow action of the first flow rule in response to searching the flow sub-table.

Example 36 includes the subject matter of Example 35, and wherein: the means for searching the plurality of vector Bloom filters comprises means for determining whether the vector Bloom filter key matches any vector Bloom filter of the plurality of vector Bloom filters; and the means for searching the flow sub-table comprises means for determining whether the header of the network packet matches any flow rule of the flow sub-table that is associated with the vector Bloom filter.

Example 37 includes the subject matter of any of Examples 35 and 36, and further comprising: means for searching the plurality of flow sub-tables for the first flow rule that matches the header of the network packet in response to determining that the vector Bloom filter key does not match any vector Bloom filter or in response to determining that the header of the network packet does not match any flow rule of the flow sub-table that is associated with the vector Bloom filter, wherein the first flow rule is included in a first flow sub-table; and means for inserting the vector Bloom filter key into a vector Bloom filter that is associated with the first flow sub-table in response to searching the plurality of flow sub-tables for the first flow rule.

Example 38 includes the subject matter of any of Examples 35-37, and wherein the means for applying the flow action of the first flow rule further comprises means for applying the flow action of the first flow rule in response to searching the plurality of flow sub-tables for the first flow rule.

Example 39 includes the subject matter of any of Examples 35-38, and wherein the means for searching the plurality of flow sub-tables comprises: means for masking the header of the network packet with the mask associated with a flow sub-table to generate a masked header; means for generating a Bloom filter key as a function of the masked header; and means for determining whether the Bloom filter key matches a Bloom filter associated with the flow sub-table.

Example 40 includes the subject matter of any of Examples 35-39, and wherein the means for searching the plurality of flow sub-tables comprises means for sequentially searching each flow sub-table of the plurality of flow sub-tables in an order that is determined based on length of the mask associated with each flow sub-table.

Example 41 includes the subject matter of any of Examples 35-40, and wherein the means for searching the plurality of flow sub-tables for the first flow rule that matches the header of the network packet comprises means for determining whether the header of the network packet matches any flow rule of the plurality of flow sub-tables.

Example 42 includes the subject matter of any of Examples 35-41, and further comprising means for applying a default flow action in response to determining that the header of the network packet does not match any flow rule of the plurality of flow sub-tables.

Example 43 includes the subject matter of any of Examples 35-42, and wherein the means for generating the vector Bloom filter key comprises: means for hashing the header of the network packet with a plurality of hash functions to generate a plurality of hash values; and means for generating a plurality of bit positions as a function of the plurality of hash values, wherein each bit position corresponds to a hash value.

Example 44 includes the subject matter of any of Examples 35-43, and wherein the means for searching the flow sub-table that is associated with the first vector Bloom filter for the first flow rule comprises: means for masking the header of the network packet with the mask associated with the flow sub-table to generate a masked header; and means for searching the flow sub-table for a flow rule that matches the masked header.

Example 45 includes the subject matter of any of Examples 35-44, and wherein the means for searching the flow sub-table for the flow rule that matches the masked header comprises means for indexing the flow sub-table with the masked header.

Example 46 includes the subject matter of any of Examples 35-45, and wherein the means for applying the flow action comprises means for forwarding the network packet or dropping the network packet.

Example 47 includes the subject matter of any of Examples 35-46, and wherein each flow rule comprises a match pattern and a flow action.

Example 48 includes the subject matter of any of Examples 35-47, and wherein the network packet comprises a data link layer packet.

Example 49 includes the subject matter of any of Examples 35-48, and wherein the network packet comprises an Ethernet frame.

The invention claimed is:

1. A computing device for network packet routing, the computing device comprising:

one or more processors;
a memory having a plurality of instructions stored thereon that, when executed by the one or more processors, causes the computing device to establish:
an input stage to receive a network packet that includes a header;
a sub-table lookup stage to (i) generate a vector Bloom filter key as a function of the header of the network packet, and (ii) search a plurality of vector Bloom filters for a first vector Bloom filter that matches the vector Bloom filter key, wherein each vector Bloom filter is associated with a flow sub-table, wherein each flow sub-table comprises one or more flow rules, and wherein each flow sub-table is associated with a mask;
a rule lookup stage to search a flow sub-table that is associated with the first vector Bloom filter for a first flow rule that matches the header of the network packet in response to a search of the plurality of vector Bloom filters for the first vector Bloom filter comprises to: (i) mask the header of the network packet with the mask associated with the flow sub-table to generate a masked header and (2) search the flow sub-table for a flow rule that matches the masked header; and
an action stage to apply a flow action of the first flow rule in response to a search of the flow sub-table.

2. The computing device of claim 1, wherein:
to search the plurality of vector Bloom filters comprises to determine whether the vector Bloom filter key matches any vector Bloom filter of the plurality of vector Bloom filters; and
to search the flow sub-table comprises to determine whether the header of the network packet matches any flow rule of the flow sub-table that is associated with the vector Bloom filter.

3. The computing device of claim 2, further comprising a fallback search stage to:
search the plurality of flow sub-tables for the first flow rule that matches the header of the network packet in response to a determination that the vector Bloom filter key does not match any vector Bloom filter or in response to a determination that the header of the network packet does not match any flow rule of the flow sub-table that is associated with the vector Bloom filter, wherein the first flow rule is included in a first flow sub-table;
wherein the sub-table lookup stage is further to insert the vector Bloom filter key into a vector Bloom filter that is associated with the first flow sub-table in response to a search of the plurality of flow sub-tables for the first flow rule.

4. The computing device of claim 3, wherein to apply the flow action of the first flow rule further comprises to apply the flow action of the first flow rule in response to the search of the plurality of flow sub-tables for the first flow rule.

5. The computing device of claim 3, wherein to search the plurality of flow sub-tables comprises to:
mask the header of the network packet with the mask associated with a flow sub-table to generate a masked header;
generate a Bloom filter key as a function of the masked header; and
determine whether the Bloom filter key matches a Bloom filter associated with the flow sub-table.

6. The computing device of claim 3, wherein to search the plurality of flow sub-tables comprises to sequentially search each flow sub-table of the plurality of flow sub-tables in an order that is determined based on a length of the mask associated with each flow sub-table.

7. The computing device of claim 3, wherein to search the plurality of flow sub-tables for the first flow rule that matches the header of the network packet comprises to determine whether the header of the network packet matches any flow rule of the plurality of flow sub-tables.

8. The computing device of claim 7, wherein the action stage is further to apply a default flow action in response to a determination that the header of the network packet does not match any flow rule of the plurality of flow sub-tables.

9. The computing device of claim 1, wherein to generate the vector Bloom filter key comprises to:
hash the header of the network packet with a plurality of hash functions to generate a plurality of hash values; and
generate a plurality of bit positions as a function of the plurality of hash values, wherein each bit position corresponds to a hash value.

10. The computing device of claim 1, wherein to search the flow sub-table for the flow rule that matches the masked header comprises to index the flow sub-table with the masked header.

11. The computing device of claim 1, wherein the network packet comprises a data link layer packet.

12. The computing device of claim 1, wherein the network packet comprises an Ethernet frame.

13. A method for network packet routing, the method comprising:
receiving, by a computing device, a network packet that includes a header;
generating, by the computing device, a vector Bloom filter key as a function of the header of the network packet;
searching, by the computing device, a plurality of vector Bloom filters for a first vector Bloom filter that matches the vector Bloom filter key comprises (i) masking the header of the network packet with the mask associated with the flow sub-table to generate a masked header and (ii) searching the flow sub-table for a flow rule that matches the masked header, wherein each vector Bloom filter is associated with a flow sub-table, wherein each flow sub-table comprises one or more flow rules, and wherein each flow sub-table is associated with a mask;
searching, by the computing device, a flow sub-table that is associated with the first vector Bloom filter for a first flow rule that matches the header of the network packet in response to searching the plurality of vector Bloom filters for the first vector Bloom filter; and
applying, by the computing device, a flow action of the first flow rule in response to searching the flow sub-table.

14. The method of claim 13, wherein:
searching the plurality of vector Bloom filters comprises determining whether the vector Bloom filter key matches any vector Bloom filter of the plurality of vector Bloom filters; and
searching the flow sub-table comprises determining whether the header of the network packet matches any flow rule of the flow sub-table that is associated with the vector Bloom filter.

15. The method of claim 14, further comprising:
searching, by the computing device, the plurality of flow sub-tables for the first flow rule that matches the header of the network packet in response to determining that the vector Bloom filter key does not match any vector Bloom filter or in response to determining that the header of the network packet does not match any flow rule of the flow sub-table that is associated with the vector Bloom filter, wherein the first flow rule is included in a first flow sub-table; and inserting, by the computing device, the vector Bloom filter key into a vector Bloom filter that is associated with the first flow sub-table in response to searching the plurality of flow sub-tables for the first flow rule.

16. The method of claim 15, wherein searching the plurality of flow sub-tables comprises:

masking the header of the network packet with the mask associated with a flow sub-table to generate a masked header;

generating a Bloom filter key as a function of the masked header; and determining whether the Bloom filter key matches a Bloom filter associated with the flow sub-table.

17. The method of claim 13, wherein generating the vector Bloom filter key comprises:

hashing the header of the network packet with a plurality of hash functions to generate a plurality of hash values; and generating a plurality of bit positions as a function of the plurality of hash values, wherein each bit position corresponds to a hash value.

18. One or more non-transitory, computer-readable storage media comprising a plurality of instructions that in response to being executed cause a computing device to:

receive a network packet that includes a header;

generate a vector Bloom filter key as a function of the header of the network packet;

search a plurality of vector Bloom filters for a first vector Bloom filter that matches the vector Bloom filter key comprises to: (i) mask the header of the network packet with the mask associated with the flow sub-table to generate a masked header and (ii) search the flow sub-table for a flow rule that matches the masked header, wherein each vector Bloom filter is associated with a flow sub-table, wherein each flow sub-table comprises one or more flow rules, and wherein each flow sub-table is associated with a mask;

search a flow sub-table that is associated with the first vector Bloom filter for a first flow rule that matches the header of the network packet in response to searching the plurality of vector Bloom filters for the first vector Bloom filter; and apply a flow action of the first flow rule in response to searching the flow sub-table.

19. The one or more non-transitory, computer-readable storage media of claim 18, wherein:

to search the plurality of vector Bloom filters comprises to determine whether the vector Bloom filter key matches any vector Bloom filter of the plurality of vector Bloom filters; and to search the flow sub-table comprises to determine whether the header of the network packet matches any flow rule of the flow sub-table that is associated with the vector Bloom filter.

20. The one or more non-transitory, computer-readable storage media of claim 19, further comprising a plurality of instructions that in response to being executed cause the computing device to:

search the plurality of flow sub-tables for the first flow rule that matches the header of the network packet in response to determining that the vector Bloom filter key does not match any vector Bloom filter or in response to determining that the header of the network packet does not match any flow rule of the flow sub-table that is associated with the vector Bloom filter, wherein the first flow rule is included in a first flow sub-table; and insert the vector Bloom filter key into a vector Bloom filter that is associated with the first flow sub-table in response to searching the plurality of flow sub-tables for the first flow rule.

21. The one or more non-transitory, computer-readable storage media of claim 20, wherein to search the plurality of flow sub-tables comprises to:

mask the header of the network packet with the mask associated with a flow sub-table to generate a masked header;

generate a Bloom filter key as a function of the masked header; and determine whether the Bloom filter key matches a Bloom filter associated with the flow sub-table.

22. The one or more non-transitory, computer-readable storage media of claim 18, wherein to generate the vector Bloom filter key comprises to:

hash the header of the network packet with a plurality of hash functions to generate a plurality of hash values; and generate a plurality of bit positions as a function of the plurality of hash values, wherein each bit position corresponds to a hash value.

* * * * *